United States Patent [19]

Riemer

[11] Patent Number: 5,336,513
[45] Date of Patent: Aug. 9, 1994

[54] BITTERNESS INHIBITORS

[75] Inventor: Jed A. Riemer, Scarsdale, N.Y.

[73] Assignee: Kraft General Foods, Inc., Northfield, Ill.

[21] Appl. No.: 163,494

[22] Filed: Dec. 7, 1993

Related U.S. Application Data

[60] Division of Ser. No. 27,568, Mar. 5, 1993, which is a continuation of Ser. No. 840,651, Feb. 20, 1992, abandoned, which is a continuation of Ser. No. 658,146, Feb. 20, 1991, abandoned.

[51] Int. Cl.$^5$ ............................................... A23L 1/236
[52] U.S. Cl. .................................... 426/548; 426/538; 426/595; 426/656
[58] Field of Search ........................................... 426/548

[56] References Cited

U.S. PATENT DOCUMENTS

| | | |
|---|---|---|
| 3,296,079 | 1/1967 | Griffin . |
| 3,647,482 | 3/1972 | Yueh . |
| 3,667,969 | 6/1972 | Kracauer . |
| 3,908,026 | 9/1975 | Neely et al. . |
| 3,908,028 | 9/1975 | Neely et al. . |
| 3,924,017 | 12/1975 | Lee et al. . |
| 4,304,794 | 12/1981 | Dwivedi et al. . |
| 4,758,438 | 7/1988 | Stroz et al. . |

*Primary Examiner*—Joseph Golian
*Attorney, Agent, or Firm*—Thomas A. Marcoux; Thomas R. Savoie

[57] ABSTRACT

Bitterness inhibitors are disclosed which are derivations of cinnamic acid. A process for reducing the bitterness of consumable materials is set forth which comprises the addition of the bitterness inhibitors at a level of from about 0.001% to 0.2% by weight. The preferred bitterness inhibitors are caffeic acid and ferulic acid.

4 Claims, No Drawings

BITTERNESS INHIBITORS

This is a division of application Ser. No. 027,568 filed Mar. 5, 1993 which in turn is a continuation of application Ser. No. 840,651 filed Feb. 20, 1992, now abandoned, which in turn is a continuation of application Ser. No. 658,146 filed Feb. 20, 1991, now abandoned.

TECHNICAL FIELD

The present invention relates to a process for reducing the bitterness of consumable materials having this property by the addition of derivatives of cinnamic acid preferably caffeic acid and/or ferulic acid.

BACKGROUND ART

Various consumable food products contain bitter substances which adversely contribute to the overall flavor impact of the food. In many instances, the flavor quality of such food products would be improved if the bitter notes could be removed or diminished while at the same time preserving the contribution made to overall flavor by the non-bitter flavor components. Thus, food products such as beer, coffee, and soft drinks sweetened with non-nutritive sweeteners may possess bitter flavors or after-flavors that are generally regarded as undesirable by many consumers.

Several processes have been described for reducing the bitter notes commonly found in non-nutritive sweeteners such as saccharin, cyclohexylsulfamic acid, dihydrochalcones, stevioside, xylitol and the like. U.S. Pat. No. 3,296,079 discloses the addition of 0.003% to 160% maltol to comestibles sweetened with non-nutritive sweeteners to mask unpleasant aftertaste. U.S. Pat. No. 4,304,794 describes addition of aliphatic polyols to minimize the bitter aftertaste of 2,4,6,3'-tetrahydrozy-4'-methoxydihydrochalcone. The bitter aftertase of saccharin is diminished through mixture with monellin and thaumatin in U.S. Pat. No. 4,758,438, with ribonucleosides, ribonucleotides and their deoxy analogs in U.S. Pat. No. 3,647,482, and with D-galactose in U.S. Pat. No. 3,667,969.

U.S. Pat. Nos. 3,908,026 and 3,907,028 teach that when paramethoxycinnamaldehyde (PMCA) is mixed or codissolved with other known natural or synthetic sweetening agents, the resulting composition has enhanced sweetness characteristics. The patent further disclosed that PMCA enhanced the flavor characteristics of vanillin and of instant coffee while suppressing the bitterness associated therewith.

U.S. Pat. No. 3,924,017 discloses that salts of chlorogenic acid, caffeic acid, cynarine, and their isomers impart a very pleasant sweet character to non-sweet foodstuffs or to foods of very low sweetness such as water and milk and that the composition contemplated therewith would effectively mask any unpleasant taste. It was further disclosed that relatively large amounts of the salts are needed to induce the sweetness, a minimum of 0.3–0.5% for more sensitive tasters and 1–3% for the average individual.

DISCLOSURE OF THE INVENTION

It has been discovered that certain cinnamic acid derivatives have the ability to inhibit the taste of bitter compounds and the bitter taste of artificial sweeteners. The following derivatives of cinnamic acid and their food acceptable salts were found to be effective as bitter inhibitors: cinnamic acid, coumaric acid, caffeic acid, ferulic acid and sinapic acid. Ferulic and caffeic acid appear to be the most active bitterness inhibitors and as a result they are the preferred inhibitors of the present invention. More specfically, it has been found that the bitterness inhibitors of the present invention, preferably the salts of caffeic acid and of ferulic acid are able to inhibit the bitterness characteristics of consumable materials having this property when added to the consumable materials at concentrations from about 0.001 to about 0.2% and that the inhibition of bitterness is not accompanied by perceptable sweetness induction.

The advantages of using the salts of this invention to inhibit bitterness are manifold. Both caffeic acid and ferulic acid are natural substances found in food. They are nontoxic compounds suitable for addition to foods at levels found effective for bitterness inhibition according to the present invention. Importantly, the salts of caffeic and ferulic acid have very little flavor of their own with the consequence that they can be added to foods at levels which effectively inhibit the bitterness qualities thereof but which contribute little or no sweetness or other undesirable flavor modification. In addition, both are readily available or are readily derivable from natural materials at reasonable cost. Thus, an effective, low cost means for bitterness inhibition is afforded by the invention.

BEST MODE FOR CARRYING OUT THE INVENTION

Caffeic acid may be derived from a number of sources. The artichoke is known to be a source of chlorogenic acid and cynarin from which caffeic acid may be derived by hydrolysis. Caffeic aid and ferulic acid are known as degration products of lignin and may be formed through the microbial transformation of coniferyl alcohol or coumaryl alcohol which are also derivable from lignin (see Martin, J. P., et al., in "Lignin Biodegradation: Microbiology, Chemistry, and Potential Applications" Vol. I pp 78–97 CRC Press Inc., Boca Raton, Fla., 1980). Wheat bran and corn hulls are know to be rich sources of ferulic acid combined with plant cell wall components and may be obtained in crude form therefrom through a procedure involving saponification with an alcoholic solution of sodium hydroxide (U.S. Pat. No. 4,038,481). Both caffeic acid and ferulic acid may of course be derived through totally synthetic means.

Mixtures of both the cis and trans forms of caffeic and ferulic acid are suitable for use as bitterness inhibitors according to the invention. Since the trans forms of these acids are the most prevalent forms found in nature, it is preferred that the trans forms be used in practicing the invention.

Caffeic and ferulic acids are most effective when used in the form of food acceptable salts for solubility reasons. Thus, the preferred forms are the sodium, potassium and ammonium salts which may be formed through neutralization of the acids with the appropriate base prior to use as a bitterness inhibitors or may be formed in situ after addition of the acids to the consumable materials being treated according to the invention.

It is envisioned that the bitterness inhibitors of the present invention may be added to many different types of consumable materials, including foodstuffs and pharmaceutical preparations. Notable among these, however, are those food products possessing marked or undesirable bitterness characteristics such as chocolate, coffee, and tea. Of special significance are beverages, desserts including puddings, gelatin and frozen desserts and other consumable materials including toothpaste and mouthwashes sweetened with artificial sweeteners such as saccharin and acesulfame K or seasoned with protein hydrolysates whose overall flavor quality may be improved through the addition of caffeic and/or ferulic acid salts. The bitterness inhibitors of the present invention have been found to be ineffective against inhibiting the bitterness of limonin and naringen (from citrus), isohumulone (from beer) and potassium chloride.

It has been found that as little as 0.001% by weight of caffeic and ferulic acid salts are effective for inhibiting bitterness according to the invention. In some food products, up to about 0.2% by weight of the inhibitor may be required depending on the degree of bitterness inhibition desired and the nature of the foodstuff. The preferred range of use is between 0.01% and 0.1%. However, the most desirable quantity to be used may readily be determined by simple trial and error measures.

The following examples further illustrate the invention.

EXAMPLE 1

A solution of 90 mg caffeic acid (trans—form obtained from Penta International Corporation, Catalogue No. T8682), 5 ml 0.1M NaOH, and 8 ppm quinine sulfate was made up in 100 ml water. The NaOH was effective to form the sodium salt of caffeic acid in situ. The solution was rated by a panel of tasters as being slightly bitter as compared with an 8 ppm quinine sulfate solution which was rated as very bitter.

EXAMPLE 2

A solution of 90 mg caffeic, 5 ml 0.1M NaOH, and 400 ppm sodium saccharin was made up in 100 ml water. This solution was rated by a panel of tasters as being sweet with no bitterness as compared with 400 ppm sodium saccharin solution which was rated as both sweet and bitter.

EXAMPLE 3

Sodium ferulate salt was prepared accoding to the following procedure: ferulic acid (3.88 g, Sigma Chemical Co., catalogue no. F3500) was dissolved in 0.1M sodium hydrozide and the resulting solution freeze-dried to yield the sodium ferulate (hereinafter abbreviated as NaF) as an off-white solid.

A quantitative tasting of sodium ferulate as a bitterness inhibitor was carried out as follows. A panel of tasters was asked to hold a test solution in their mouths for a few seconds, spit it out, then rate the perceived bitterness on a scale of 0 (none), 1 (low), 2 (moderate), 3 (high) or 4 (very high). Intermediate scores were allowed. The average scores for various solutions are shown in the table.

| BITTERNESS EVALUATION OF TEST SOLUTIONS | | | |
|---|---|---|---|
| Untreated Sol'n' | Score | Treated Sol'n' | Score |
| 500 ppm sacch. | 2.4 | 550 ppm NaF added | 1.5 |
| 600 ppm sacch. in a reconstituted dry beverage mix | 2.3 | 450 ppm NaF added | 1.4 |
| 1200 ppm acesulf. | 2.4 | 450 ppm NaF added | 0.6 |
| 1000 ppm acesulf. | 2.7 | 450 ppm NaF added | 1.2 |

| -continued | | | |
|---|---|---|---|
| BITTERNESS EVALUATION OF TEST SOLUTIONS | | | |
| Untreated Sol'n' | Score | Treated Sol'n' | Score |
| in a reconstitued dry beverage mix | | | |
| 500 ppm caffeine | 1.8 | 450 ppm NaF added | 0.7 |
| 8 ppm quinine sulfate | 3.2 | 450 ppm NaF added | 2.0 | sacch. is sodium saccharin
acesulf. is acesulfame K

As can be observed from the table, the addition of the minor amounts of NaF reduced significantly the perceived bitterness imparted by saccharine, acesulfame K, caffeine and quinine sulfate.

EXAMPLE 4

Sodium ferulate was prepared by the procedure set forth in Example 3. 500 mg acesulfame K and 90 mg sodium ferulate was dissolved in 500 ml of water along with 1.3 g punch flavored unsweetened dry beverage mix. The reconstituted beverage was judged by a trained taste panel to have a much reduced bitter aftertaste as compared to an acesulfame sweetened beverage without sodium ferulate.

EXAMPLE 5

Sodium ferulate was prepared by the procedure set forth in Example 3 and was incorporated into a chocolate drink. Black cocoa powder (20 g) was added to 500 ml of hot water and the mixture stirred for 1 hour. The mixture was then filtered, and the aqueous extract divided into three 150 ml portions. One portion was left untreated as a control, and sodium ferulate was added to the two remaining portions (15 mg and 45 mg) to give 100 ppm and 300 ppm concentrations, respectively. A panel of tasters evaluated the solution for bitterness and rated the taste on a scale of 0 (none) to 10 (extremely high). The results are as follows:

| | Average Score |
|---|---|
| Control | 4.8 |
| 100 ppm ferulic | 3.7 |
| 300 ppm ferulic | 3.1 |

EXAMPLE 6

Sodium ferulate was tested in black, unsweetened brewed Columbian roasted and ground coffee at three concentration levels: 100 ppm, 250 ppm, and 500 ppm. The majority of eight tasters felt that there was a significant reduction of the coffee bitterness at all three levels. Some tasters described the higher levels as being "flat" or "non-coffee-like" due to the almost total elimination of the bitterness. Some off-notes were detected at the highest sodium ferulate level.

I claim:

1. A process for reducing the bitterness of a food preparation containing artificial sweeteners having bitter flavor notes comprising the addition of about 0.001% to about 0.2% by weight of a bitterness inhibitor to said food, said bitterness inhibitor comprising ferulic acid or a food acceptable salt thereof.

2. The process of claim 1 wherein the artificial sweetener is saccharin or acesulfame K.

3. The process of claim 2 wherein the bitterness inhibitor is added at a range of about 0.01% to 0.1% by weight.

4. The process of claim 3 wherein the artificial sweetener is acesulfame K.

* * * * *